United States Patent [19]

Irving

[11] 4,436,880

[45] Mar. 13, 1984

[54] HEAT-CURABLE EPOXIDE RESIN COMPOSITIONS

[75] Inventor: Edward Irving, Burwell, England

[73] Assignee: Ciba-Geigy Corporation, Ardsley, N.Y.

[21] Appl. No.: 462,820

[22] Filed: Feb. 1, 1983

[30] Foreign Application Priority Data

Feb. 11, 1982 [GB] United Kingdom ............... 8204053

[51] Int. Cl.$^3$ ..................... C08G 59/72; C08G 59/68
[52] U.S. Cl. ................................. 525/504; 525/506; 528/88; 528/91; 528/361; 528/368; 528/373; 528/408
[58] Field of Search .............. 528/88, 91, 361, 368, 528/373, 408; 525/504, 506

[56] References Cited

U.S. PATENT DOCUMENTS

| | | | |
|---|---|---|---|
| 3,072,606 | 1/1963 | Zuppinger et al. | 260/47 |
| 3,072,607 | 1/1963 | Binningen et al. | 260/47 |
| 3,352,826 | 11/1967 | McWhorter et al. | 528/91 X |
| 3,657,381 | 4/1972 | Speitel et al. | 260/836 |

FOREIGN PATENT DOCUMENTS

1033263 7/1966 United Kingdom .
1223338 4/1971 United Kingdom .

OTHER PUBLICATIONS

Abstract, West Germany 1,240,282 (Derwent C.P.I. 83839P).
Abstract, Japanese 36800/1974 (Derwent C.P.I. 84988V/49).
Abstract, Japanese 103985/1974 (Derwent C.P.I. 02777W/02).
Abstract, Japanese 58172/1975 (Derwent C.P.I. 85296/52).
Handbook of Epoxy Resins, Lee & Neville, McGraw-Hill Book Co., pp. 11-2 to 11-8, 1967.
Epoxy Resins Chemistry & Technology, May & Tanaka, Marcel Dekker Inc., p. 202, 1973.

*Primary Examiner*—Earl A. Nielsen
*Attorney, Agent, or Firm*—Harry Falber

[57] ABSTRACT

Compositions containing
(a) an epoxide resin containing more than one 2,3-epoxypropyl group per average molecule,
(b) a boron trifluoride-amine complex which is a latent hardener for epoxide resins, such as BF$_3$-ethylamine, and
(c) certain oxidants, such as benzoyl peroxide or 2,3-dichloro-5,6-dicyanobenzoquinone, are stable on storage at ambient temperature but cure rapidly when heated above a certain threshold temperature, the oxidant having a marked accelerating effect on the rate of curing.

10 Claims, No Drawings

HEAT-CURABLE EPOXIDE RESIN COMPOSITIONS

BACKGROUND OF THE INVENTION

This invention relates to heat-curable compositions comprising epoxide resins, certain Lewis acid latent hardeners for epoxide resins, and organic oxidising agents, and to the use of these compositions as laminating and moulding resins, surface coatings, adhesives, and the like.

Latent hardeners for epoxide resins (i.e., substances containing, on average, more than one 1,2-epoxide group per molecule) are very well known. Such materials may be mixed with the epoxide resin and stored at room temperature or below for extended periods without causing cross-linking of the resin: only when the mixture is heated does crosslinking take place to any significant extent. Typical such hardeners are Lewis acids, such as complexes of boron trifluoride, especially the amine complexes. The use of such complexes is described by Lee and Neville in "Handbook of Epoxy Resins", McGraw-Hill Inc., 1967, Chapter 11, pages 2 to 8, and by May and Tanaka in "Epoxy Resins—Chemistry and Technology", Marcel Dekker Inc., 1973, p. 202.

These complexes are usually employed as hardeners for epoxide resins wherein at least one of the 1,2-epoxide groups is present as a 2,3-epoxypropyl group, typically diglycidyl ethers of bisphenols; if used with epoxide resins which are more reactive towards them, such as epoxycycloaliphatic compounds, the storage stability of the mixtures is severely curtailed. A known drawback in using these hardeners with epoxide resins containing more than one 2,3-epoxypropyl group is the relatively lengthy time they require to be heated with such resins in order to bring about gelation and cure. It would clearly be desirable to have a mixture which cures very rapidly once it is heated above a certain critical temperature but which remains stable for prolonged periods below that temperature. We have found that this object can be achieved by inclusion in the epoxide resin-hardener mixture of certain organic oxidants.

Incorporation of an organic oxidant (benzoyl peroxide) into a composition containing an epoxide resin and a Lewis acid latent hardener (a boron trifluoride-triethanolamine complex) is known, having been described in Japanese Published Patent Application No. 103985/1974. The mixture described also contained an ethylenically unsaturated monomer, 2-hydroxyethyl acrylate, and the purpose of the oxidant was to effect polymerisation of this monomer.

Polymerisation of this monomer under conditions in which the epoxide resin remained uncured was demonstrated in unpublished experiments by the present applicant. A mixture of 19.1 parts by weight of an epoxide resin (a polyglycidyl ether of 2,2-bis(4-hydroxyphenyl)-propane having a 1,2-epoxide content of 5.16 equivalents per kilogram), 0.86 part by weight of boron trifluoride-monoethylamine complex, and 2 parts by weight of 2-hydroxyethyl acrylate was stored at 25° C. for 11 weeks, during which time its viscosity, masured at 25° C., increased from 0.8 Pa s to 2.35 Pa s, i.e., by a factor of about 3. A similar mixture, but also containing 0.6 part by weight of a 50% dispersion of benzoyl peroxide in dibutyl phthalate, increased in viscosity over the same period and under the same conditions from 0.7 Pa s to 8.5 Pa s, i.e., by a factor of about 12. A similar mixture, but containing no 2-hydroxyethyl acrylate, increased in viscosity from 11 Pa s to 51 Pa s, an increase by a factor of 4.6. The large increase in viscosity that occurred only when both the monomeric acrylate and the peroxide were present is indicative of polymerisation of this monomer occurring on storage at 25° C.

Incorporation of an epoxide resin with another polymerisable species, together with a curing agent for the epoxide resin and a peroxide curing agent for the other polymerisable species, is comparatively common. The following references illustrate this.

In U.S. Pat. Nos. 3,072,606 and 3,072,607 there are described compositions containing an epoxide resin, boron trifluoride, optionally as a complex with an amine, a peroxide and, in the first of these patents, a cyclic ether or thioether and, in the second, a compound containing at least two furan or thiophene rings. In both patents it is stated that a peroxide may be added as a conventional accelerator for copolymerisation of the epoxide resin with the cyclic compound. In the two examples in which a peroxide is used, the boron trifluoride is not present as an amine complex, cure of the mixture being effected rapidly at room temperature.

Compositions containing an epoxide resin, an unsaturated polyester, a boron trifluoride-amine complex, and an organic peroxide are described in West German Auslegeschrift No. 1 240 282 (Derwent C.P.I. Abstract No. 83839P). Peroxides are well-known catalysts for the cure of unsaturated polyesters, and their presence in such compositions is by no means unusual. There is therefore no indication that the peroxide has any effect on the cure of the epoxide resin.

Compositions containing a diallyl phthalate or dimethallyl phthalate prepolymer or telomer, an epoxide resin, an organic peroxide as polymerisation catalyst for the prepolymer or telomer, and a heat-curing agent for the epoxide resin, such as a boron trifluoride-amine complex, are disclosed in British Pat. No. 1,223,338. Use of a boron trifluoride-amine complex in such mixtures is not exemplified, and the Patent gives no information as to the effect of adding a peroxide to such a composition in the absence of the phthalate prepolymer or telomer.

Coating compositions containing polyvinyl chloride, an epoxide resin, an ester having at least three acrylic or methacrylic residues, and optionally also a peroxide and a hardener for the epoxide resin, such as a boron trifluoride complex, are disclosed in U.S. Pat. No. 3,657,381. Use of a boron trifluoride-amine complex is exemplified in a composition containing cumyl hydroperoxide, an epoxide resin, and a tetramethacrylate. The effect of mixing an epoxide resin with a latent curing agent and a peroxide in the absence of a free radical-curable monomer is not discussed.

Japanese Kokai No. 36800/1974 (Derwent C.P.I. No. 84988V/49), discloses the production of prepregs and laminates using a composition containing an epoxide resin, a bismaleimide, and a diamine. In an example such a composition also contained boron trifluoride-ethylamine complex and ethyl methyl ketone peroxide.

Finally, Japanese Kokai No. 58172/1975 (Derwent C.P.I. No. 85296W/52), describes the preparation of prepregs from compositions containing an epoxide resin (triglycidyl isocyanurate), a liquid polybutadiene, an organic peroxide and, optionally, a boron trifluoride-amine complex.

It is believed that incorporation of an organic oxidant into a mixture containing an epoxide resin and a boron trifluoride-amine complex, which mixture is substantially free from other cationically-polymerisable materials, is novel, and that the accelerating effect of the oxidant on the curing action of the boron trifluoride complex could not have been predicted from the disclosures of the above-mentioned prior art.

The acceleration by peroxides of the cure of epoxide resins with antimony compounds is described in British Patent Specification No. 1,033,263. The antimony compounds described in that Specification are not latent curing agents since they start to cure the epoxide resin at room temperature. The peroxide accelerates this room temperature cure. It is stated to be possible, using a less reactive antimony compound, a more stable peroxide, and a less reactive epoxide, to obtain mixtures that are stable at room temperatures for several days or weeks but which will polymerise rapidly on heating. Such extended stability is, apparently, brought about solely by the use of less reactive agents. The Specification does, however, show that peroxides are active accelerators for the cure of epoxide resins at room temperature. It is therefore surprising that a mixture of an epoxide resin, a latent hardener, and an organic oxidant is substantially as stable at room temperature as is the same mixture containing no organic oxidant and yet, when such mixtures are heated above their critical temperature, the mixture containing the oxidant cures at a much faster rate than does that with no oxidant.

SUMMARY OF THE INVENTION

This invention accordingly provides heat-curable compositions, substantially free from unsaturated polymerisable material, comprising
(a) an epoxide resin containing more than one 2,3-epoxypropyl group per average molecule,
(b) a latent hardener for epoxide resins that is a boron trifluoride-amine complex, and
(c) an organic oxidant selected from quinones, peroxides, and iodosoaromatic compounds.

Another aspect of this invention provides a process for the curing of an epoxide resin containing more than one 2,3-epoxypropyl group per average molecule, comprising heating a heat-curable composition of this invention.

DETAILED DISCLOSURE

Component (a) preferably has 2,3-epoxypropyl groups directly attached to an atom or atoms of oxygen.

As examples of such resins may be mentioned polyglycidyl esters obtainable by reaction of a compound containing two or more carboxylic acid groups per molecule with epichlorohydrin or glycerol dichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hxahydrophthalic acid, and 4-methylhexahydrophthalic acid; and from aromatic polycarboxylic acids such as phthalic acid, isophthalic acid, and terephthalic acid.

Further examples are polyglycidyl ethers obtainable by reaction of a compound containing at least two free alcoholic hydroxyl and/or phenolic hydroxyl groups per molecule with epichlorohydrin under alkaline conditions, or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, poly(oxytetramethylene) glycols, pentane-1,5-diol, hexane-2,4,6-triol, glycerol, 1,1,1-trimethylolpropane, pentaerythritol sorbitol, and polyepichlorohydrins; from cycloaliphatic alcohols such as resorcitol, quinitol, bis(4-hydroxycyclohexyl)methane, and 2,2-bis(4-hydroxycyclohexyl)propane, and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane (otherwise known as bisphenol F), 4,4'-dihydroxydiphenyl, bis(4-hydroxyphenyl) sulphone, 1,1,2,2-tetrakis(4-hydroxyphenyl)ethane, 2,2-bis(4-hydroxyphenyl)propane, (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenol itself, and phenol substituted in the ring by chlorine atoms or by alkyl groups each containing up to nine carbon atoms, such as 4-chlorophenol, 2-methylphenol, and 4-tert.butylphenol.

Although not preferred, poly(N-glycidyl) compounds may be used, e.g., N-glycidyl derivatives of amines such as aniline, n-butylamine, bis(4-aminophenyl)methane, and bis(4-methylaminophenyl)methane; triglycidyl isocyanurate, and N,N'-diglycidyl derivatives of cyclic alkylene ureas, such as ethyleneurea and 1,3-propyleneurea, and of hydantoins such as 5,5-dimethylhydantoin.

Poly(S-glycidyl) compounds may also be used, e.g., di(S-glycidyl) derivatives of dithiols such as ethane-1,2-dithiol and bis(4-mercaptomethylphenyl) ether, but they, too, are not preferred.

Epoxide resins having 2,3-epoxypropyl groups attached to different types of hetero atoms may be employed, e.g., glycidyl 2-(glycidyloxy)benzoate and p-(glycidylamino)phenyl glycidyl ether, as may mixtures of epoxide resins.

Especially preferred epoxide resins used in the compositions of this invention are glycidyl ethers, which may have been advanced, of dihydric phenols such as 2,2-bis(4-hydroxyphenyl)propane and bis(4-hydroxyphenyl)methane and of dihydric aliphatic alcohols such as butane-1,4-diol.

Boron trifluoride complexes that may be used in accordance with this invention are known and may, for example, be those with aliphatic, araliphatic, cycloaliphatic, or heterocyclic amines of 2 to 10 carbon atoms and having one or two primary, secondary, or tertiary amino groups. Complexes with ethylamine, diethylamine, trimethylamine, isopropylamine, di-secondary butylamine, benzylamine, isophoronediamine (3-aminomethyl-3,5,5-trimethylcyclohexylamine) or piperidine are particularly preferred.

Preferred peroxides for use as the organic oxidant are aliphatic, cycloaliphatic, and aromatic peroxides (including hydroperoxides and peresters) of up to 20 carbon atoms. They include diacyl peroxides such as benzoyl peroxide, p-chlorobenzoyl peroxide, and lauroyl peroxide; dialkyl and dicycloalkyl peroxides such as tert.butyl peroxide, cyclohexyl peroxide, and cumyl peroxide; hydroperoxides such as cumene hydroperoxide, ethyl methyl ketone peroxide, 1-hydroxy-1'-hydroperoxydicyclohexyl peroxide, and cyclohexanone peroxide; and peroxyacid esters such as di-isopropyl peroxydicarbonate, di-tert.butyl perphthalate, tert.butyl peracetate, and tert.butyl perbenzoate.

Preferred quinones as the organic oxidant are o-quinones and p-quinones (including quinomethans and quinodimethans), containing from 6 to 12 carbon atoms, such as chloroanil, 2,3-dichloro-5,6-dicyanobenzoquinone, tetrachloro-o-benzoquinone, α-naphthaquinone, and tetracyanoquinodimethan.

Preferred iodosoaromatic compounds as the organic oxidant contain 6 to 10 carbon atoms and include iodosobenzene, iodosobenzene diacetate, iodosobenzene bis(trifluoroacetate), 4-nitroiodosobenzene, and 4-chloroiodosobenzene diacetate.

An effective, i.e., a heat-curing, amount of the mixture of boron trifluoride complex (b) and organic oxidant (c) is used. The proportion of (a), (b), and (c) will depend on the nature of the complex (b), the organic oxidant (c), and of the specific resin (a), as well as on the required curing rate and properties desired in the final product. Suitable proportions may readily be determined by those familiar with the art of heat-curing epoxide resins. Usually, from 1 to 15, and preferably 4 to 12.5, parts by weight of the mixture of (b) and (c) are used per 100 parts by weight of the resin (a). Generally, 1 part of the boron trifluoride complex (b) is used with from 0.5 to 3 parts by weight of the organic oxidant (c).

The boron trifluoride complex (b) and the organic oxidant (c) may be readily dispersed in the epoxide resin by milling and three components together, or by making the complex and oxidant into a paste with γ-butyrolactone and then mixing this with the epoxide resin.

Temperatures to which the compositions should be heated, and the duration of heating, for substantially complete conversion into the cured state can readily be determined by routine tests; typically, they are heated at a temperature in the range 75° C. to 200° C., especially 90° to 170° C., and for from 1 to 40 minutes, usually 2 to 20 minutes.

The new compositions may contain additives such as fillers, reinforcing materials, colouring matters, flow control agents, flame inhibitors, and mould lubricants. Suitable extenders, fillers, and reinforcing materials are, for example, glass fibres, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as laminating resins, paints and lacquers, impregnating, casting and moulding resins, potting and insulating compounds for the electrical industry, and adhesives, and also in the manufacture of such products.

The following Examples illustrate the invention; all parts and percentages are by weight. The accelerating effect is shown, as is conventional in this art, by the reduction in the time taken for the composition to gel, prior to curing: gelation times were determined by means of a "Techne" gelation timer, supplied by Techne (Cambridge) Limited, Duxford, Cambridge, England.

"Epoxide resin I" denotes a polyglycidyl ether of 2,2-bis(4-hydroxyphenyl)propane having a 1,2-epoxide content of 5.16 equivalents per kilogram.

"Epoxide resin II" denotes 1,3-diglycidyl-5,5-dimethylhydantoin.

EXAMPLE 1

Epoxide resin I (15 g), boron trifluoride-monoethylamine complex (0.67 g), and 1 g of a 50% dispersion of benzoyl peroxide in dibutyl phthalate were mixed together. Part of this mixture was stored at 25° C. and it remained ungelled after 1 month. The other part of this mixture was heated at 120° C.; it gelled after 14 minutes.

The experiment was repeated, replacing the benzoyl peroxide by 0.4 g of iodosobenzene bis(trifluoroacetate). Gelation occurred also after 14 minutes.

When the experiment was repeated but omitting any oxidant, gelation occurred only after heating for 55 minutes.

EXAMPLE 2

Epoxide resin I (15 g), 0.67 g of a 52% solution in methanol of isophoronediamine bis(boron trifluoride) complex, and 1 g of a 50% dispersion of benzoyl peroxide in dibutyl phthalate were mixed and a sample was heated at 120° C. Gelation occurred after 34 minutes. When the experiment was repeated but omitting the benzoyl peroxide, gelation occurred only after 62 minutes at 120° C.

EXAMPLE 3

Boron trifluoride-monoethylamine complex (0.45 g) and 2,3-dichloro-5,6-dicyanobenzoquinone (0.45 g) were mixed to a paste with 0.9 g of γ-butyrolactone, then dispersed in Epoxide Resin I (15 g). The mixture was heated at 160° C. and gelation occurred after 4 minutes.

The experiment was repeated, replacing the dichlorodicyanobenzoquinone by iodosobenzene diacetate (0.90 g). Gelation occurred after 8 minutes at 160° C.

When the experiment was repeated in the absence of any organic oxidant, gelation occurred only after 11 minutes at 160° C.

EXAMPLE 4

Epoxide resin I (15 g), boron trifluoride-trimethylamine complex (0.6 g), and 1 g of a 50% dispersion of benzoyl peroxide in dibutyl phthalate were mixed together and heated at 140° C. Gelation occurred after 15½ hours. When the experiment was repeated, but omitting the benzoyl peroxide, no gelation had occurred when the heating was stopped after 24 hours.

EXAMPLE 5

The following compositions were prepared and stored at 25° C. for 11 weeks, their viscosity at 25° C. being determined periodically. Their gel times were then determined at 120° C.

TABLE 1

|  | Composition a | Composition b |
|---|---|---|
| Epoxide resin I | 40 parts | 40 parts |
| Boron trifluoride-monoethylamine | 1.8 parts | 1.8 parts |
| Dispersion of benzoyl peroxide in dibutyl phthalate | — | 2.67 parts |
| Initial viscosity | 15.1 Pa s | 1.0 Pa s |
| Viscosity after 4 weeks | 30.5 Pa s | 21.5 Pa s |
| Viscosity after 11 weeks | 52.6 Pa s | 51.0 Pa s |
| Gel time | 95 minutes | 24 minutes |

It may be seen that the accelerating effect of the oxidant (Composition b) is achieved without loss of storage life.

EXAMPLE 6

The procedure of Example 5 was repeated, using a different boron trifluoride complex and a storage time of 9 weeks. The results were as follows:

TABLE 2

|  | Composition c | Composition d |
|---|---|---|
| Epoxide resin I | 90 parts | 90 parts |
| Complex of boron trifluoride (2 mol) with isophorone-diamine (1 mol) | 2 parts | 2 parts |
| Dispersion of benzoyl peroxide (50%) in dibutyl phthalate | — | 6 parts |
| Initial viscosity | 12.0 Pa s | 8.0 Pa s |
| Viscosity after 9 weeks | 25.5 Pa s | 21.0 Pa s |
| Gel time | 61 minutes | 48 minutes |

Again, it is clearly shown that the accelerating effect of an oxidant (Composition d) does not involve sacrifice of storage life.

EXAMPLE 7

Epoxide resin II (150 parts), boron trifluoride-triethylamine complex (5 parts), and a dispersion of benzoyl peroxide (50%) in dibutyl phthalate (2.5 parts) were mixed and heated at 120° C. Gelation occurred after 16 minutes. When the experiment was repeated, but omitting the benzoyl peroxide, gelation occurred only after 25 minutes.

What is claimed is:

1. A heat-curable composition, substantially free from any unsaturated polymerisable material, comprising
   (a) an epoxide resin containing more than one 2,3-epoxypropyl group per average molecule,
   (b) a latent hardener for epoxide resins that is a boron trifluoride-amine complex, and
   (c) an organic oxidant selected from quinones, peroxides, and iodosoaromatic compounds.

2. A composition according to claim 1, in which the epoxide resin (a) has the 2,3-epoxypropyl groups directly attached to an atom or atoms of oxygen.

3. A composition according to claim 1, in which the boron trifluoride is complexed with an aliphatic, araliphatic, cycloaliphatic, or heterocyclic amine of 2 to 10 carbon atoms having from one to two primary, secondary, or tertiary amino groups.

4. A composition according to claim 1, in which the boron trifluoride is complexed with ethylamine, diethylamine, trimethylamine, isopropylamine, di-secondary butylamine, benzylamine, isophoronediamine, or piperidine.

5. A composition according to claim 1, in which the organic oxidant (c) is an aliphatic, cycloaliphatic, or aromatic peroxide of up to 20 carbon atoms.

6. A composition according to claim 1, in which the organic oxidant (c) is an o-quinone or a p-quinone containing from 6 to 12 carbon atoms.

7. A composition according to claim 1, in which the organic oxidant (c) is an iodosoaromatic compound of 6 to 10 carbon atoms.

8. A composition according to claim 1, containing from 1 to 15 parts by weight of the mixture of the latent hardener (b) and the organic oxidant (c) per 100 parts by weight of the resin (a).

9. A composition according to claim 1, containing 1 part by weight of the latent hardener (b) per 0.5 to 3 parts by weight of the organic oxidant (c).

10. A process for curing an epoxide resin containing more than one 2,3-epoxypropyl group per average molecule, comprising heating a composition as claimed in claim 1.

* * * * *